Feb. 29, 1944.   P. C. TEMPLE   2,342,770
VALVE MECHANISM
Filed July 31, 1941   2 Sheets-Sheet 1

Inventor
PAUL C. TEMPLE
By Albert G. Blodgett
Attorney

Feb. 29, 1944.  P. C. TEMPLE  2,342,770
VALVE MECHANISM
Filed July 31, 1941   2 Sheets-Sheet 2

Inventor
PAUL C. TEMPLE
By Albert G. Blodgett
Attorney

Patented Feb. 29, 1944

2,342,770

UNITED STATES PATENT OFFICE 2,342,770

VALVE MECHANISM

Paul C. Temple, Decatur, Ill., assignor to A. W. Cash Company, Decatur, Ill., a corporation of Delaware Application July 31, 1941, Serial No. 404,748

7 Claims. (Cl. 277—7)

This invention relates to valve mechanisms, and more particularly to valves adapted to control the operation of hydraulic motors.

It is one object of the invention to provide a valve mechanism of comparatively simple and inexpensive construction which is adapted to control a hydraulic motor and to lock the motor positively so that it cannot move in either direction from a desired position.

It is a further object of the invention to provide a valve mechanism of the four-way type which is particularly suitable for manual operation and capable of controlling a hydraulic motor in an accurate and positive manner.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a section through a four-way valve mechanism, the section being taken on the line 1—1 of Fig. 3;

Figure 2:
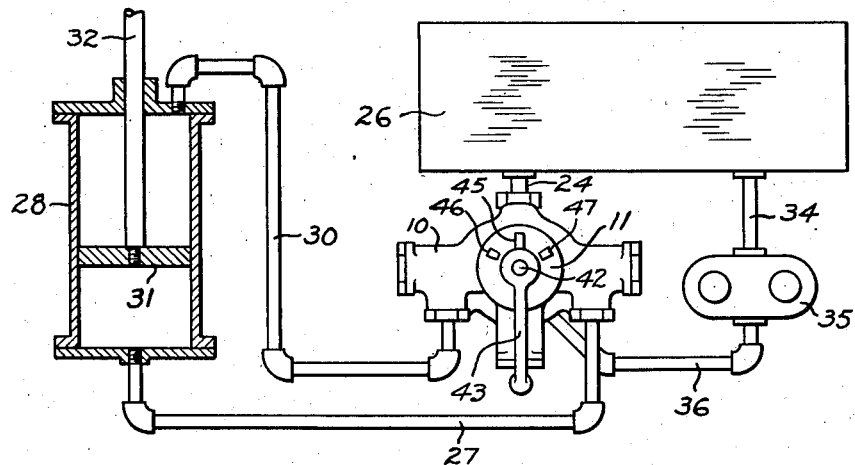
Fig. 2 is an elevation of the valve mechanism, with other apparatus connected thereto.
Figure 1:
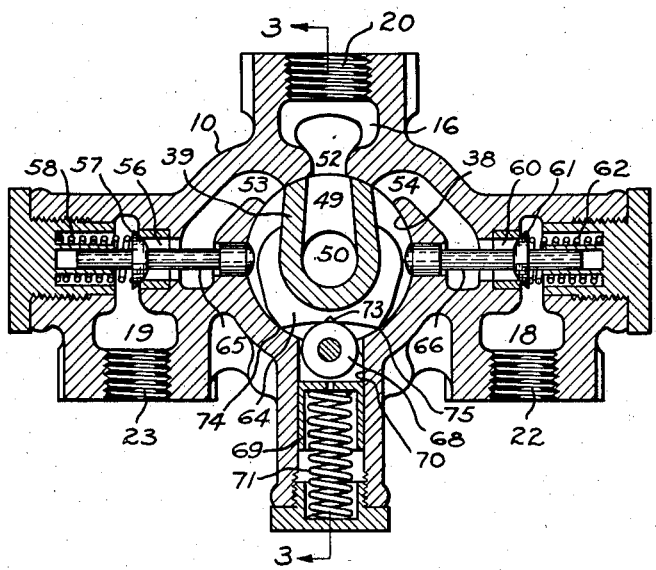
Figure 3:
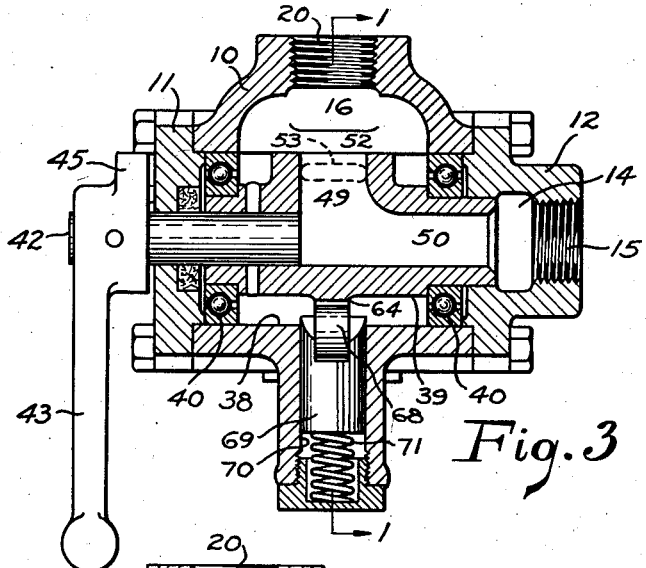
Fig. 3 is a section on the line 3—3 of Fig. 1.

The embodiment illustrated comprises a main body 10 having heads 11 and 12 secured to opposite sides thereof, as shown in Fig. 3, to form a hollow casing. The head 12 is shaped to provide an inlet chamber 14 having an inlet opening 15. The body 10 is shaped to provide an exhaust chamber 16 and two chambers 18 and 19 (Fig. 1). For lack of better terms, the chambers 18 and 19 will be respectively designated as "raise" and "lower" chambers. An exhaust opening 20 leads directly from the exhaust chamber 16, and two openings 22 and 23 communicate directly with the chambers 18 and 19 respectively. As indicated in Fig. 2, the exhaust opening 20 may be connected by a pipe 24 to the bottom of a tank or reservoir 26 containing a suitable operating fluid, such as oil. The opening 22 is connected by a pipe 27 to the lower end of an upright cylinder 28, and the opening 23 is connected by a pipe 30 to the upper end of this same cylinder. Within the cylinder there is provided a slidable piston 31 having a piston rod 32. Oil is withdrawn from the tank 26 through a pipe 34 by means of a pump 35 and delivered through a pipe 36 to the inlet opening 15. The pump may be driven by any suitable source of power. The piston rod 31 may be connected to any apparatus or device which is to be actuated thereby.

Referring now to Figs. 1 and 3, it will be seen that the body 10 is provided with a cylindrical bore 38 which extends therethrough between the two heads 11 and 12. Within the bore is a valve 39 which is rotatably supported in two axially spaced ball bearings 40 mounted in the respective end portions of the bore. A stem 42 extends axially outward from one end of the valve and through the head 11, the outer end of this stem having a handle 43 thereon, so that the valve may be turned about its axis. This handle is provided with a lug 45 which is located between two stops 46 and 47 (Fig. 2) on the head 11, so arranged as to limit the movements of the valve to approximately ninety degrees. The central portion of the valve is provided with a radially extending port 49 which connects with an axial passage 50 leading directly into the inlet chamber 14. In the direction of the port 49 the valve has substantially the same radius as the bore 38 to form a seal adjacent the outer end of this port, but other portions of the valve are spaced from the wall of the bore to allow free circulation of fluid around the valve.

Figure 4:
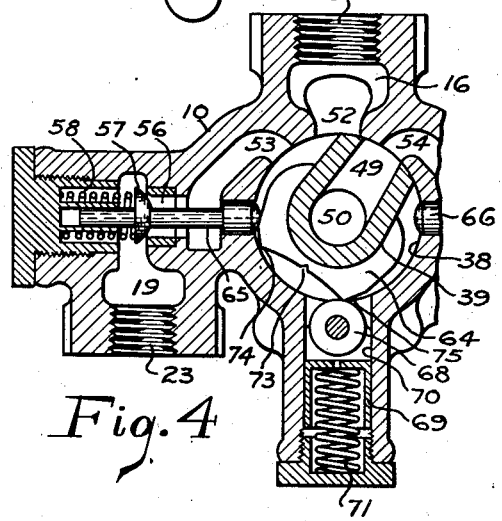
Fig. 4 is a fragmentary view of a portion of Fig. 1, but showing the valve in a different position of adjustment.
Figure 5:
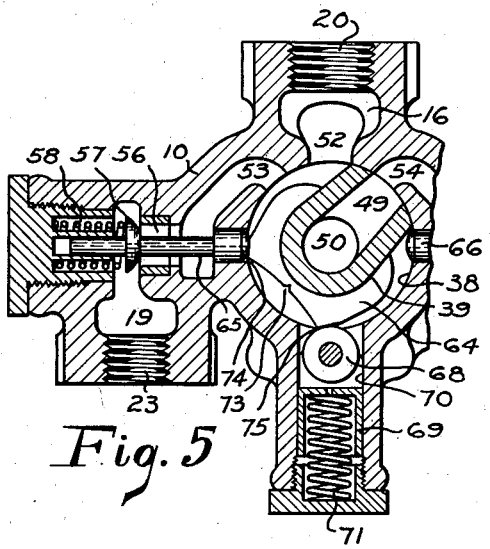
Fig. 5 is a view similar to Fig. 4, but showing the valve in a still different position of adjustment.

Three ports are provided in the wall of the bore 38. A port 52 connects the exhaust chamber 16 with the bore, and two ports 53 and 54 are located at opposite sides of the port 52. The ports 53 and 54 are preferably of substantially the same length in the axial direction as the valve port 49, whereas the port 52 is considerably longer so that it will remain in free communication with the bore regardless of the valve position. These parts are so arranged that with the valve in its central or neutral position, as shown in Fig. 1, the valve port 49 will register with the exhaust port 52. If the valve is turned in a clockwise direction until the lug 45 engages the stop 47, the valve port 49 will register with the port 54, as shown in Fig. 5. Similarly, if the valve is turned in a counter-clockwise direction until the lug 45 engages the stop 46, the valve port 49 will register with the port 53. The valve port 49 is somewhat wider circumferentially than the ports 53 and 54 so that, as indicated in Fig. 4, the full travel of the valve is not required to afford full port opening. The purpose of this construction will be made apparent hereinafter.

Referring now to Fig. 1, it will be seen that the port 53 is connected with the "lower" chamber 19 by a passage 56 which is controlled by a reciprocable check valve 57 of the seating type arranged to open in the direction of flow toward the chamber 19. This valve is biased toward its closed position by a coiled compression spring 58. Similarly, the port 54 is connected with the "raise" chamber 18 by a passage 60 which is controlled by a reciprocable check valve 61 of the seating type arranged to open in the direction of flow toward the chamber 18. This valve 61 is biased toward its closed position by a coiled compression spring 62. The two check valves 57 and 61 are located on opposite sides of the bore 38 and arranged to reciprocate in a common line which intersects the axis of the rotary valve 39 at right angles. Each check valve opens in a direction away from the bore 38.

The check valves are operated automatically through the medium of a positive mechanical connection in response to movements of the rotary valve 39. For this purpose a cam 64 is formed on the outer surface of the rotary valve, within the bore 38, and two slidable pins 65 and 66 extend radially into the bore from the valves 57 and 61 respectively. These parts are so constructed and arranged that when the rotary valve is turned in a clockwise direction from its neutral position, the cam 64 will engage the pin 65 and push the same outwardly, thereby opening the check valve 57. Similarly, if the rotary valve is turned in a counter-clockwise direction, the cam will engage the pin 66 and push it outwardly, opening the check valve 61.

In order to facilitate the operation of the apparatus, an indexing roller 68 is provided to engage the cam. This roller is mounted on the inner end of a plunger 69 which is slidable in a radial bore 70 formed in the body 10 directly opposite the exhaust port 52 and communicating with the bore 38. This plunger is urged inwardly by a coiled compression spring 71. The cam 64 is shaped to provide a low point 73, which may be notched as shown, located directly opposite the valve port 49 and arranged to be engaged by the roller 68 when the valve 39 is in its neutral position. At opposite sides of this low point there are high points 74 and 75 which are arranged to pass slightly beyond the center of the roller when the valve is moved to its respective extreme positions as determined by the stops 46 and 47.

The operation of the invention will now be apparent from the above disclosure. With the valve 39 in its central or neutral position, as shown in Fig. 1, both of the check valves 57 and 61 will be held closed by their respective springs 58 and 62. Since these check valves are of the seating type, they will be free from leakage, and no oil can escape from either end of the cylinder 28. Hence the piston 31 will be held firmly against movement in either direction. Oil from the pump will circulate freely to the exhaust through the valve port 49 and the exhaust port 52. If now the rotary valve is turned in a clockwise direction to the position shown in Fig. 4, the cam 64 will open the check valve 57, and the valve port 49 will register with the port 54. The oil will flow through the passage 60, forcing open the check valve 61, and through the "raise" chamber 18, opening 22, and pipe 27 to the lower end of the cylinder 28. Since the check valve 57 is open, oil can escape from the upper end of the cylinder 28 to the exhaust. Hence the piston 31 will be raised. If the handle 43 is released, the rotary valve will be returned to neutral position by the action of the spring 71 and roller 68 on the cam 64, since the point 75 has not quite reached the position at which maximum spring deflection occurs. If, however, the valve is turned still further in a clockwise direction until the lug 45 engages the stop 47, the point 75 will pass the position at which maximum spring deflection occurs, and the effect will be to hold the parts in the positions shown in Fig. 5 until they are reversed by the application of force to the handle. The direction of fluid flow will be the same in Fig. 5 as in Fig. 4. The valves and ports are of symmetrical construction, and it will be apparent that by turning the rotary valve in a counter-clockwise direction, the flow of oil will be such as to lower the piston 31. Furthermore, if the handle is moved the full distance permitted by the stop 46, the valve will remain stationary without holding the handle, whereas if the parts are stopped somewhat short of the full distance they will return to neutral upon release of the handle.

Figure 6:
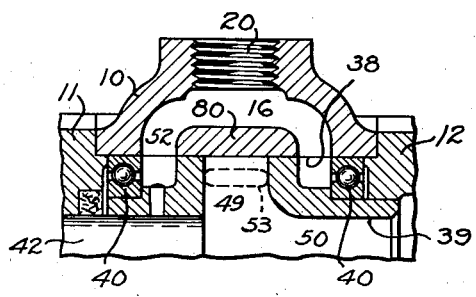
Fig. 6 is a fragmentary view of a portion of Fig. 3, showing a slightly modified construction.

In case the pump 35 is to supply oil for the operation of other apparatus besides the piston 31, it may be desirable to maintain a pressure in the oil even when the rotary valve is in neutral position. For this purpose, as shown in Fig. 6, the body 10 may be shaped to provide a wall 80 which closes the exhaust port 52 except for the end portions thereof. Thus when the rotary valve is in its neutral position this wall 80 will prevent the escape of oil from the valve port 49, and the oil in the inlet chamber 14 may be maintained at a sufficiently high pressure to operate the other apparatus.

Having thus described my invention, what I claim as new and desire to secure by Letters Patent is:

1. A valve mechanism comprising a casing shaped to provide an inlet chamber, an exhaust chamber, a "raise" chamber, and a "lower" chamber, two passages communicating with the "raise" and "lower" chambers respectively, a manually operable valve mounted in the casing and having two operative positions in each of which one of the passages is connected with the inlet chamber and the other passage is connected with the exhaust chamber, a seating-type check valve in each passage and arranged to be opened automatically by fluid flow from the inlet chamber through the passage, the check valves being biased toward their closed positions, and means providing positive mechanical connections from the manually operable valve to the check valves and effective, when either passage is connected with the inlet chamber, to open the check valve in the other passage.

2. A valve mechanism comprising a casing shaped to provide an inlet chamber, an exhaust chamber, a "raise" chamber, and a "lower" chamber, two passages communicating with the "raise" and "lower" chambers respectively, a manually rotatable valve mounted in the casing and having a neutral position in which neither passage is connected with the inlet chamber and two operative positions in each of which one of the passages is connected with the inlet chamber and the other passage is connected with the exhaust chamber, the neutral position being intermediate the two operative positions, a seating-type check valve in each passage and arranged to be opened automatically by fluid flow from the inlet chamber through the passage, the check valves being biased toward their closed positions, and means providing positive mechanical connections from the rotatable valve to the check valves and effective, when either passage is connected with the inlet chamber, to open the check valve in the other passage.

3. A valve mechanism comprising a casing shaped to provide an inlet chamber, an exhaust chamber, a "raise" chamber, and a "lower" chamber, two passages communicating with the "raise" and "lower" chambers respectively, a manually operable valve mounted in the casing and having a neutral position in which the exhaust chamber is connected with the inlet chamber and neither passage is connected with the inlet chamber, the manually operable valve also having two operative positions in each of which one of the passages is connected with the inlet chamber and the other passage is connected with the exhaust chamber, the neutral position being intermediate the two operative positions, a seating-type check valve in each passage and arranged to be opened automatically by fluid flow from the inlet chamber through the passage, the check valves being biased toward their closed positions, and means providing positive mechanical connections from the manually operable valve to the check valves and effective, when either passage is connected with the inlet chamber, to open the check valve in the other passage.

4. A valve mechanism comprising a casing shaped to provide an inlet chamber, an exhaust chamber, a "raise" chamber, and a "lower" chamber, two passages communicating with the "raise" and "lower" chambers respectively, a manually operable valve mounted in the casing and having a neutral position in which the inlet chamber is connected neither with the exhaust chamber nor with either of said passages and two operative positions in each of which one of the passages is connected with the inlet chamber and the other passage is connected with the exhaust chamber, the neutral position being intermediate the two operative positions, a seating-type check valve in each passage and arranged to be opened automatically by fluid flow from the inlet chamber through the passage, the check valves being biased toward their closed positions, and means providing positive mechanical connections from the manually operable valve to the check valves and effective, when either passage is connected with the inlet chamber, to open the check valve in the other passage.

5. A valve mechanism comprising a casing shaped to provide an inlet chamber, an exhaust chamber, a "raise" chamber, and a "lower" chamber, two passages communicating with the "raise" and "lower" chambers respectively, a manually rotatable valve mounted in the casing and having a neutral position in which neither passage is connected with the inlet chamber and two operative positions in each of which one of the passages is connected with the inlet chamber and the other passage is connected with the exhaust chamber, the neutral position being intermediate the two operative positions, a seating-type check valve in each passage and arranged to be opened automatically by fluid flow from the inlet chamber through the passage, the check valves being biased toward their closed positions, and a cam on the rotatable valve and effective, when either passage is connected with the inlet chamber, to open the check valve in the other passage.

6. A valve mechanism comprising a casing shaped to provide a bore, an inlet chamber, an exhaust chamber, a "raise" chamber, and a "lower" chamber, two passages connecting the bore with the "raise" chamber and the "lower" chamber respectively, a manually rotatable valve mounted in the bore and provided with an axial passage which connects with the inlet chamber and a port which extends radially outward from the axial passage, the valve port being adapted to register with each of the two passages selectively, a seating-type check valve in each of the said two passages and arranged to be opened automatically by fluid flow from the inlet chamber through the corresponding passage, the check valves being biased toward their closed positions, means providing positive mechanical connections from the rotatable valve to the check valves and effective, when the valve port is brought into registration with either of the said two passages, to open the check valve in the other of the said two passages, and a port connecting the exhaust chamber with the bore.

7. A valve mechanism comprising a casing shaped to provide a bore, an inlet chamber, an exhaust chamber, a "raise" chamber, and a "lower" chamber, two passages connecting the bore with the "raise" chamber and the "lower" chamber respectively, a manually rotatable valve mounted in the bore and provided with an axial passage which connects with the inlet chamber and a port which extends radially outward from the axial passage, the valve port being adapted to register with each of the two passages selectively, a seating-type check valve in each of the said two passages and arranged to be opened automatically by fluid flow from the inlet chamber through the corresponding passage, the check valves being biased toward their closed positions, a slidable pin extending from each check valve into the bore, a cam on the rotatable valve arranged to engage the pins and effective, when the valve port is brought into registration with either of the said two passages, to open the check valve in the other of the said two passages, and a port connecting the exhaust chamber with the bore.

PAUL C. TEMPLE.